United States Patent
Park et al.

(10) Patent No.: US 9,720,165 B2
(45) Date of Patent: Aug. 1, 2017

(54) ILLUMINATION DEVICE AND DISPLAY DEVICE INCLUDING THE SAME

(71) Applicant: Samsung Display Co., Ltd., Yongin (KR)

(72) Inventors: Se Ki Park, Hwaseong-si (KR); Sung Yong Kang, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 209 days.

(21) Appl. No.: 14/669,872

(22) Filed: Mar. 26, 2015

(65) Prior Publication Data
US 2016/0085018 A1    Mar. 24, 2016

(30) Foreign Application Priority Data
Sep. 19, 2014   (KR) .......................... 10-2014-0125166

(51) Int. Cl.
*F21V 7/04*    (2006.01)
*F21V 8/00*    (2006.01)

(52) U.S. Cl.
CPC .......... *G02B 6/0083* (2013.01); *G02B 6/0036* (2013.01); *G02B 6/0055* (2013.01); *G02B 6/0061* (2013.01); *G02B 6/0068* (2013.01)

(58) Field of Classification Search
CPC .................................................. G02B 6/0083
See application file for complete search history.

(56) References Cited

U.S. PATENT DOCUMENTS

| | | | |
|---|---|---|---|
| 8,740,445 B2 | 6/2014 | Lee | |
| 2008/0273147 A1 | 11/2008 | Kim et al. | |
| 2012/0050647 A1* | 3/2012 | Chen | G02B 6/0068 349/65 |
| 2012/0170318 A1* | 7/2012 | Tsai | G02B 6/0021 362/630 |
| 2012/0175651 A1* | 7/2012 | Kim | G02B 6/009 257/91 |
| 2012/0262944 A1* | 10/2012 | Ohno | G02B 6/0083 362/611 |
| 2014/0133178 A1 | 5/2014 | Kwon et al. | |
| 2014/0153212 A1* | 6/2014 | Chen | F21V 9/14 362/19 |

FOREIGN PATENT DOCUMENTS

| | | |
|---|---|---|
| KR | 10-2011-0056966 | 5/2011 |
| KR | 10-2012-0126823 | 11/2012 |
| KR | 10-2014-0060140 | 5/2014 |

* cited by examiner

*Primary Examiner* — Evan Dzierzynski
(74) *Attorney, Agent, or Firm* — H.C. Park & Associates, PLC (57) ABSTRACT

An illumination device having a first light source package including a first electrode lead and a second electrode lead, the first and second electrode leads projecting from a side of the first light source package; a second light source package including a first electrode lead and a second electrode lead, the first and second electrode leads projecting from a side of the second light source package; and a light guide member adjacent to the first and second light source packages, The light guide member includes a light guide panel, and a circuit pattern disposed on a surface of the light guide panel, the circuit pattern including first electrode pads connected to the first electrode leads and second electrode pads connected to the second electrode leads.

19 Claims, 9 Drawing Sheets

ILLUMINATION DEVICE AND DISPLAY DEVICE INCLUDING THE SAME

CROSS-REFERENCE TO RELATED APPLICATION

This application claims priority from and the benefit of Korean Patent Application No. 10-2014-0125166, filed on Sep. 19, 2014, which is incorporated by reference for all purposes as if fully set forth herein.

BACKGROUND

Field

Exemplary embodiments relate to an illumination device and a display device including the same.

Description

A liquid crystal display (LCD) is a display device, in which liquid crystals are injected between glass substrates. In order to display an image, power is applied to upper and lower glass substrate electrodes, which changes the molecular orientation of the liquid crystals for each pixel. Unlike a cathode ray tube (CRT) or a plasma display panel (PDP), a liquid crystal display is not self-luminous, and, thus, typically incorporates a light source, e.g., an illumination device. Conventional illumination devices typically include a backlight assembly to uniformly emitting light to a display panel that enables liquid crystal displays to be better used in dark places.

Backlight assemblies can be classified into edge-illumination types and direct-illumination types according to the position of the light source. Edge-illumination type backlight assemblies includes a light guide panel for guiding and providing light that is emitted from a light source mounted on a printed circuit board to the display panel. An available avenue to slim a liquid crystal display includes slimming a backlight assembly.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a slim illumination device, as well as display devices including the same.

Additional aspects will be set forth in the detailed description which follows, and, in part, will be apparent from the disclosure, or may be learned by practice of the inventive concept.

According to exemplary embodiments, an illumination device includes a first light source package comprising a first electrode lead and a second electrode lead, the first and second electrode leads projecting from a side of the first light source package; a second light source package comprising a first electrode lead and a second electrode lead, the first and second electrode leads projecting from a side of the second light source package; and a light guide member adjacent to the first and second light source packages. The light guide member includes a light guide panel, and a circuit pattern disposed on a surface of the light guide panel, the circuit pattern comprising first electrode pads connected to the first electrode leads and second electrode pads connected to the second electrode leads.

According to exemplary embodiments, a display device includes a display panel; a first light source package comprising a first electrode lead and a second electrode lead, the first and second electrode leads projecting from a side of the first light source package; a second light source package comprising a first electrode lead and a second electrode lead, the first and second electrode leads projecting from a side of the second light source package; and a light guide member adjacent to the first and second light source packages. The light guide member includes a light guide panel comprising a first surface opposing a second surface, and a circuit pattern disposed on the first surface of the light guide panel, the circuit pattern comprising first electrode pads connected to the first electrode leads and second electrode pads connected to the second electrode leads. The display device further includes an optically-clear, adhesive film disposed between a first surface of the display panel and the second surface of the light guide panel, the optically-clear, adhesive film being arranged along an edge region of the first surface of the display panel; and fixing tape covering an edge region of a second surface of the display panel to an edge region of the first surface of the light guide panel, the second surface of the display panel opposing the first surface of the display panel.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As will be described in more detail below, a display device according to one or more exemplary embodiments includes a light guide panel on which a circuit pattern is formed, a plurality of light source packages and a light guide member, which can be connected to form one module. Accordingly, a separate printed circuit board or a flexible printed circuit board to drive the light sources of the plurality of light source packages found in other display devices does not need to be provided, allowing for slimming of the display device.

Further, since a display device according to one or more exemplary embodiments includes an optically clear adhesive film interposed between the light guide member and the display panel, and fixing tape surrounding and fixing a display panel and a light guide member, certain receptacles found in other display devices can be omitted, such as an intermediate receptacle, which was provided between the light guide panel and the display panel, and the lower receptacle and the upper receptacle, which were provided to surround the display device.

Accordingly, the display device according to exemplary embodiments can be slimmed.

Figure 1:
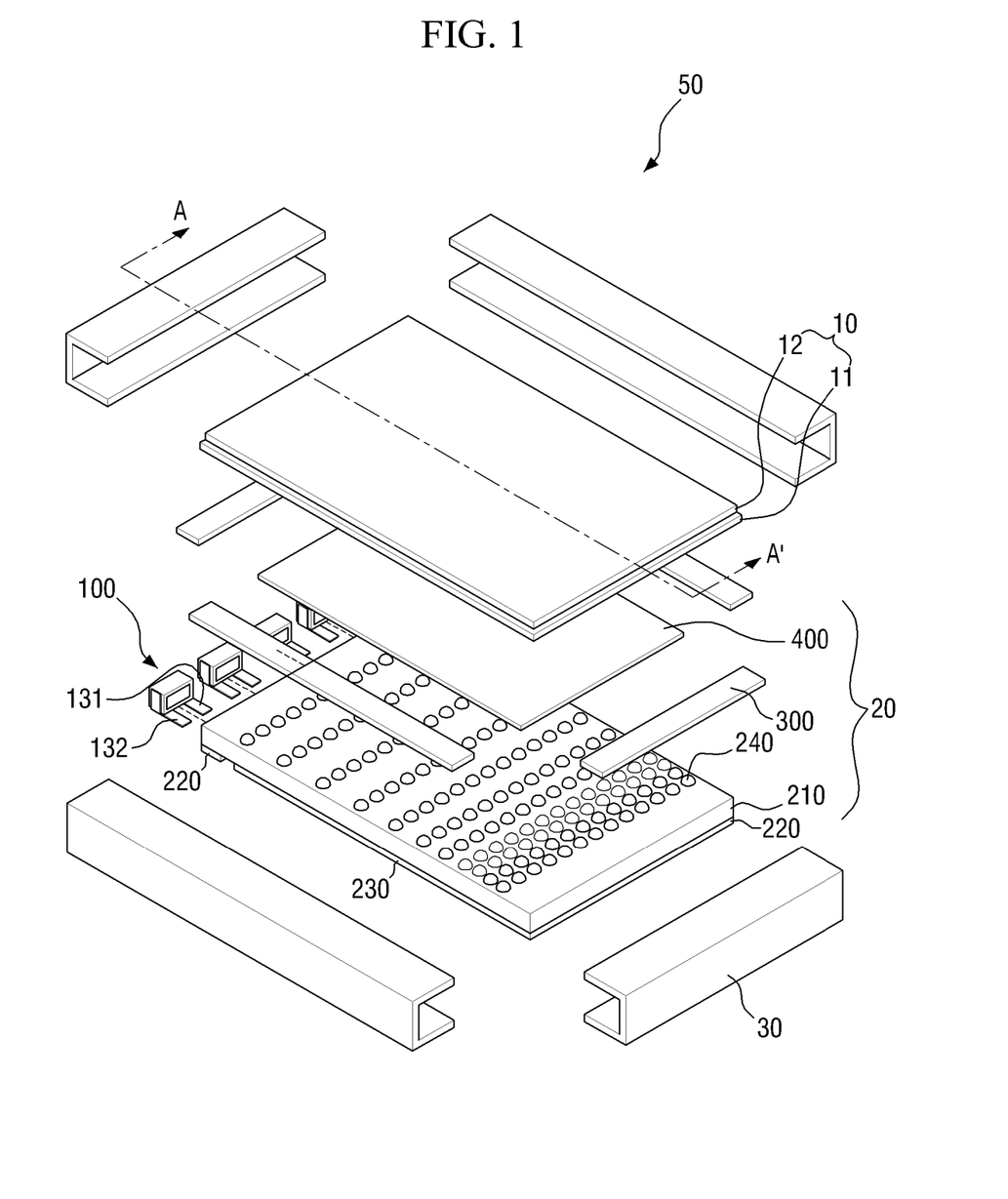
FIG. 1 is an exploded perspective view of a display device, according to one or more exemplary embodiments.
Figure 2:
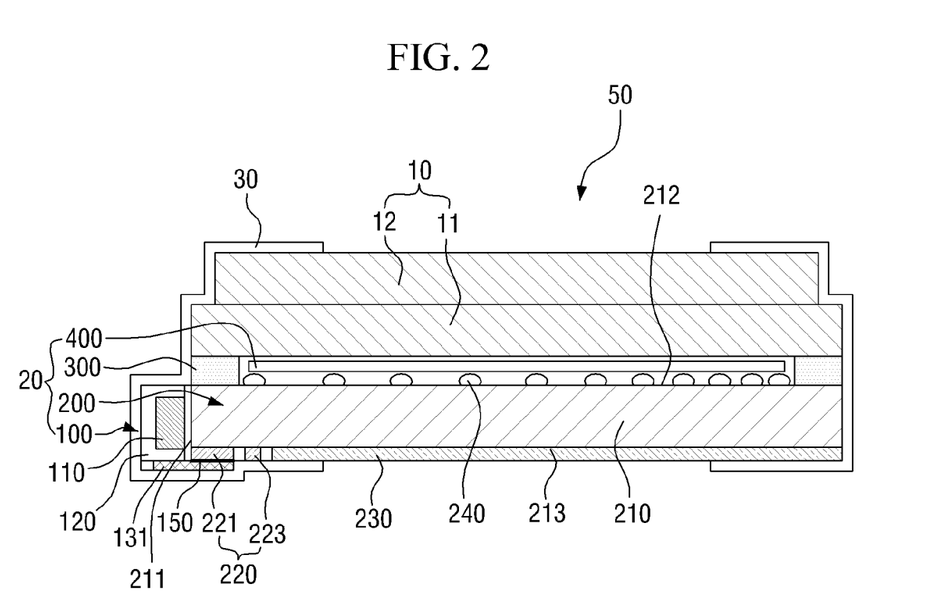
FIG. 2 is a cross-sectional view of the display device of FIG. 1 taken along sectional line A-A', according to one or more exemplary embodiments.
Figure 3:
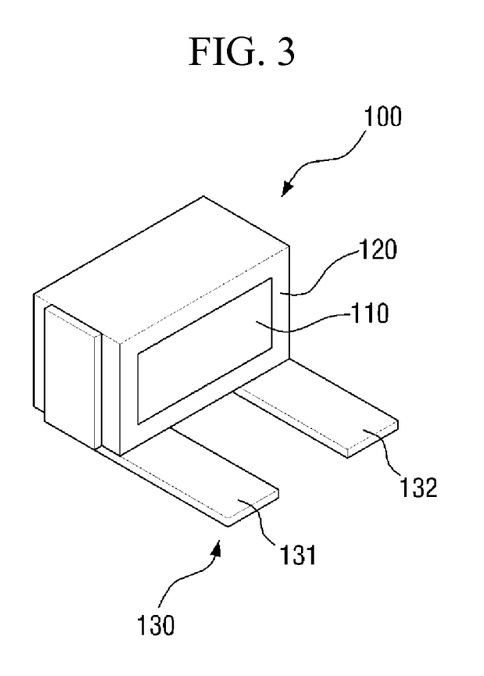
FIG. 3 is a perspective view of a light source package of the display device of FIG. 1, according to one or more exemplary embodiments.
Figure 4:
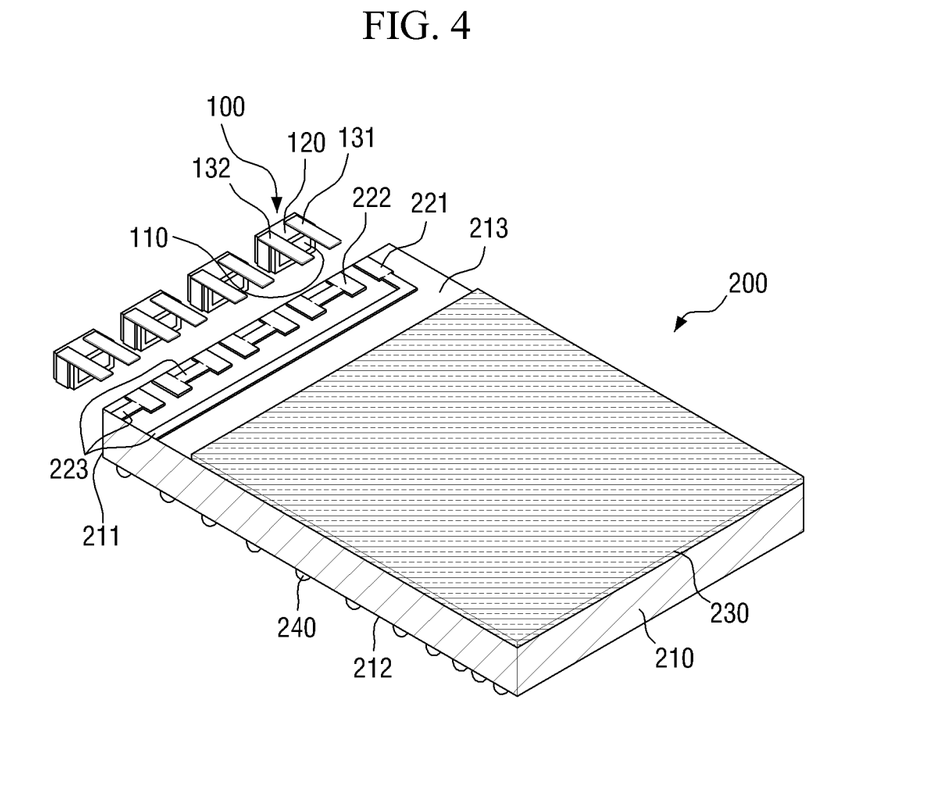
FIG. 4 is a perspective view of a circuit pattern of FIG. 1, according to one or more exemplary embodiments.

FIG. 1 is an exploded perspective view of a display device, according to one or more exemplary embodiments. FIG. 2 is a cross-sectional view of the display device of FIG. 1 taken along sectional line A-A', according to one or more exemplary embodiments. FIG. 3 is a perspective view of a light source package of the display device of FIG. 1, according to one or more exemplary embodiments. FIG. 4 is a perspective view of a circuit pattern of FIG. 1, according to one or more exemplary embodiments.

Referring to FIGS. 1 and 2, display device 50 includes display panel 10, illumination device 20, and fixing tape 30.

Display panel 10 is to display an image, and may include upper display plate 12 and lower display plate 11, which face each other. Upper display plate 12 and lower display plate 11 may be composed of glass substrates. Upper display plate 12 and lower display plate 11 may be combined with each other using a sealing material (not illustrated). A liquid crystal layer (not illustrated) may be interposed between upper display plate 12 and lower display plate 11. A polarizing sheet (not illustrated) may be attached to outsides of upper display plate 12 and lower display plate 11.

On lower display plate 11, a plurality of pixel electrodes, wiring for driving the pixel electrodes, and switching devices (not illustrated) may be formed. Further, a common electrode (not illustrated) may be provided on upper display plate 12 or lower display plate 11 to apply an electric field to the liquid crystal layer. Color filters and black matrixes (not illustrated) may be formed on upper display plate 12 or lower display plate 11.

Illumination device 20 is arranged on a lower portion of display panel 10 to generate and provide light to display panel 10. Illumination device 20 may include a plurality of light source packages 100 and light guide member 200 (see FIGS. 2 and 4). Illumination device 20 may further include optically-clear adhesive film 300 and optical sheet 400. Optically-clear, adhesive film may be transparent or have some degree of non-transparency (e.g., may be translucent), and may include polarizing or filtering effects.

The plurality of light source packages 100 may be arranged along at least one side of display panel 10. Each of light source packages 100 includes light source 110, body portion 120, and lead frame 130 (see FIG. 3).

Light source 110 is a device which substantially generates and provides light to light guide panel 210 of light guide member 200, and may correspond to, for example, a red light emitting diode that emits red light, a green light emitting diode that emits green light, a blue light emitting diode that emits blue light, and a white light emitting diode that emits white light. Light source 110 may be bonded to and may be electrically connected to lead frame 130.

Body portion 120 is formed by molding light source 110 that is bonded to lead frame 130 with resin. That is, light source 110 may be buried in body portion 120. However, light source 110 is exposed on one surface of body portion 120 so that the light can be emitted from light source 110.

Lead frame 130 is electrically connected to light source 110, and portions of it may be molded inside body portion 120. Lead frame 130 may include first electrode lead 131 and second electrode lead 132 projecting from one side of light source package 100 and exposed on an outside of body portion 120. First electrode lead 131 and second electrode lead 132 can be used as power supply terminals to supply driving power to light source 110.

Light guide member 200 is arranged on one side of the plurality of light source packages 100. Light guide member 200 serves to guide the light provided from light source packages 100 in an upper direction, and may be electrically connected to light source packages 100. Light guide member 200 includes light guide panel 210, circuit pattern 220, and reflective layer 230. Light guide member 200 may further include a plurality of projections 240.

Light guide panel 210 guides light supplied from light sources 110 of light source packages 100. An area of light guide panel 210 may be arranged to face light sources 110 of light source packages 100. Light guide panel 210 may change the traveling direction of incident light and emit light in the direction of display panel 10. Light guide panel 210 includes a light incident surface (or side surface) 211, to which the light that is generated from light sources 110 is incident, and light emission surface (or upper surface) 212.

Light guide panel 210 may be in a rectangular plate shape, but is not limited thereto. Light guide panel 210 may be composed of a glass substrate. In this case, display panel 10, which includes the lower display plate 12 and upper display plate 11 that are composed of glass substrate, and light guide panel 210 may have the same thermal expansion coefficient. Accordingly, in the case of attaching display panel 10 and light guide panel 210 to each other by applying heat thereto in a state where optically-clear adhesive film 300 is interposed between display panel 10 and light guide panel 210, display panel 10 and light guide panel 210 can be prevented from being bent, and thus deterioration of an adhesive force acting between display panel 10 and light guide panel 210 can be reduced.

Circuit pattern 220 is formed on lower surface 213 of light guide panel 210. Circuit pattern 220 may be formed on a side portion of lower surface 213 of light guide panel 210 close to light source packages 100. Circuit pattern 220 is a conductive pattern that provides paths to receive and to provide the driving power for driving light sources 110 of light source packages 100 from an external power supply unit (not illustrated), and may include, as depicted in FIG. 4, first electrode pad 221, second electrode pad 222, and driving wiring 223. Circuit pattern 220 may be formed of a metal material having high electrical conductivity, for example, copper (Cu).

First electrode pad 221 is electrically connected and attached to first electrode lead 131 of light source package 100 through conductive layer 150 (see FIG. 2). First electrode pad 221 may be an anode power supply pad. Conductive layer 150 may be composed of a solder layer or an anisotropic conductive film layer. A solder layer may be formed by curing solder cream by applying high-temperature heat thereto in a state where the solder cream is interposed between first electrode pad 221 and first electrode lead 131, and an anisotropic conductive film layer may be formed by curing insulating resin that includes conductive balls by applying high-temperature heat thereto in a state where the insulating resin that includes the conductive balls is interposed between first electrode pad 221 and first electrode lead 131. Since light guide panel 210 is composed of a glass substrate, it may not be greatly affected by the high temperature.

Second electrode pad 222 is electrically connected and attached to a second electrode lead 132 of light source package 100 through a conductive layer (not illustrated, but on same plane as conductive layer 150). Second electrode pad 222 may be a cathode power supply pad. The connection type between second electrode pad 222 and second electrode lead 132 may be the same (e.g., a solder layer or an anisotropic conductive film layer) as the connection type between first electrode pad 221 and first electrode lead 131.

Driving wiring 223 may be selectively connected to the electrode pads. FIG. 4 depicts driving wiring 223 connected to first electrode pad 221, to serve as an anode, and another portion of driving wiring connected to second electrode pad 222, to serve as a cathode (following the path of light source packages 100 connected in series, for example), so as to supply the driving power to light sources 110 of light source packages 100.

Since circuit pattern 220 is formed on light guide panel 210 as described above, light source packages 100 and light guide member 200 can be configured to form one module. Particularly, connecting the lead electrodes (131 and 132) to the electrode pads (221 and 222) using a conductive layer forms one module. Accordingly, handling of light source packages 100 and light guide member 200 can be easily performed.

Further, light sources 110 of light source packages 100 can receive the driving power through circuit pattern 220 formed on light guide panel 210 without any separate printed circuit board (PCB) or flexible printed circuit board (FPCB) (on which a circuit pattern for supplying the driving power is formed). Accordingly, due to the omission of the separate printed circuit board or flexible printed circuit board, it becomes possible to implement a slimmer illumination device 20.

Reflective layer 230 is formed beside circuit pattern 220 on lower surface 213 of light guide panel 210. That is, reflective layer 230 may be formed on a portion that is far apart from light source packages 100 on lower surface 213 of light guide panel 210. Reflective layer 230 reflects light generated from light sources 110 of light source packages 100 toward display panel 10, such as light that leaks out from, or otherwise is not applied to, light guide panel 210. Reflective layer 230 may be formed of a metal material that can reflect light, for example, silver (Ag). Reflective layer 230 may be formed on lower surface 213 of light guide panel 210, and thus can facilitate slimming of illumination device 20 in comparison to the case where reflective layer 230 is formed as a separate sheet or plate.

The plurality of projections 240 may be formed in a dot pattern on upper surface 212 of light guide panel 210. The plurality of projections 240 may refract or diffuse light incident to light guide panel 210. Gaps between adjacent projections 240 may become smaller the farther the projections are away from light source packages 100. The luminance of the light can be increased (or otherwise improved) by increasing the degree of refraction of the light toward display panel 10 in a portion of light guide panel 210 that is far apart from light source packages 100. Accordingly, the luminance of the light, which would ordinarily become lower the farther from the light source without the projections, can be prevented from being reduced in the portion of light guide panel 210 that is far apart from light source packages 100, and, thus, the luminance of the light that is provided from light guide member 200 to display panel 10 can become uniform. Plurality of projections 240 may be formed of a material that can refract light or a material that can refract and diffuse light. For example, plurality of projections 240 may be formed of a material including acryl resin and UV photo-initiators, and additives thereto.

Optically-clear adhesive film 300 may be interposed between the lower surface of display panel 10 and upper surface 212 of light guide panel 210, and may be arranged to have separate portions corresponding to the outer edge regions of the lower surface of display panel 10.

Optical sheet 400 is arranged in a space that is defined by upper surface 212 of light guide panel 210 and optically-clear adhesive film 300. Optical sheet 400 is a structure that modulates the light supplied through light guide panel 210. Optical sheet 400 may include a prism sheet, a diffusion sheet, a micro lens sheet, a lenticular sheet, a phase difference compensation sheet, and a reflective polarizing sheet.

Fixing tape 30 is attached to cover from the edge of the upper surface of display panel 10 to the edge of the lower surface of light guide panel 210. Fixing tape 30 may be arranged to have separate portions corresponding to the outer edge regions of the upper surface of display panel 10. Fixing tape 30 may be a thin insulating tape.

As described above, display device 50 according to one or more exemplary embodiments includes light guide panel 210 on which circuit pattern 220 is formed, and thus plurality of light source packages 100 and light guide member 200 can be connected to form one module. Accordingly, a printed circuit board or a flexible printed circuit board dedicated to electrically connect and drive the light sources of the plurality of light source packages need not be provided.

Further, display device 50 according to one or more exemplary embodiments includes optically-clear adhesive film 300 that is interposed between light guide member 200 and display panel 10, and thus optical film 400 can be accommodated in the space that is defined by upper surface 212 of light guide panel 210 and optically-clear adhesive film 300. Accordingly, no intermediate receptacle, of the type that could be provided between the light guide panel and the display panel, has to be included.

Further, display device 50 according to one or more exemplary embodiments includes fixing tape 30 that surrounds and fixes the uppermost portion of display panel 10 and the lowermost portion of light guide member 200. Accordingly, no lower receptacle or upper receptacle, which were provided to surround and support the display device, has to be included.

Accordingly, display device 50 according to one or more exemplary embodiments can be slimmed down through the combination and arrangement of plurality of light source packages 100 in a module with light guide panel 200, and by providing optically-clear adhesive film 300, and fixing tape 30.

Figure 5:
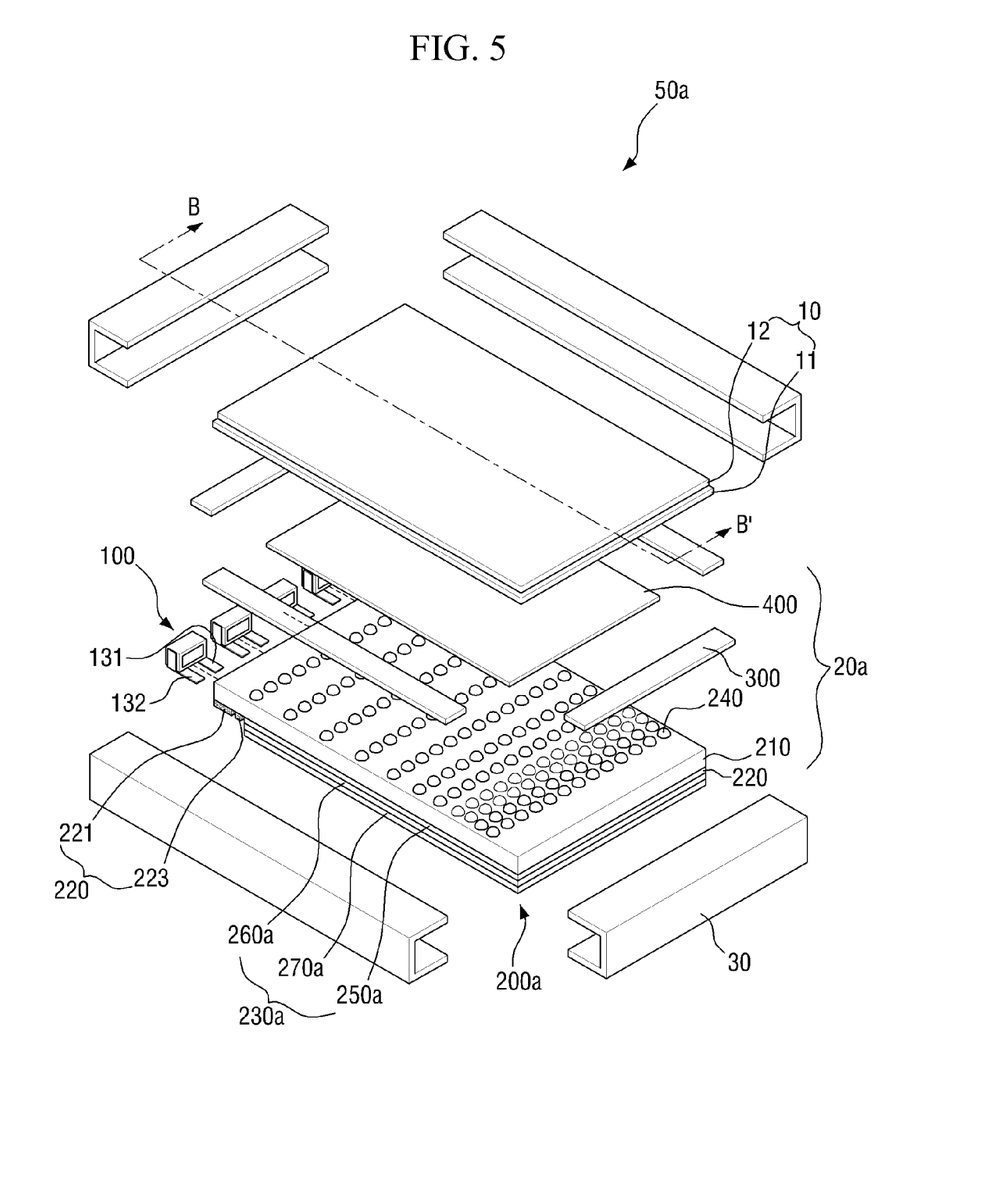
FIG. 5 is an exploded perspective view of a display device, according to one or more exemplary embodiments.
Figure 6:
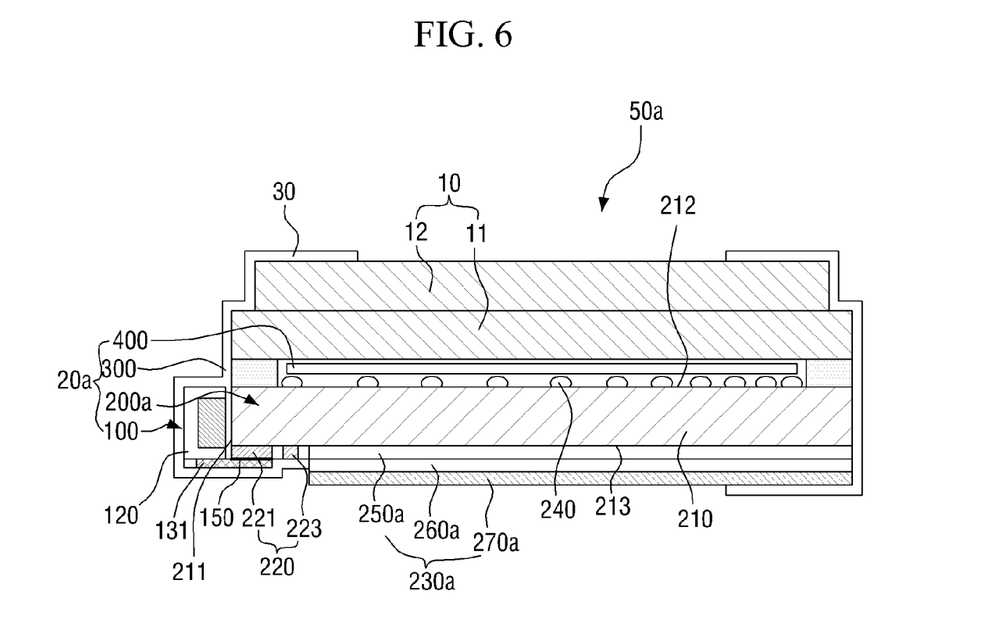
FIG. 6 is a cross-sectional view of the display device of FIG. 5 taken along sectional line B-B', according to one or more exemplary embodiments.

FIG. 5 is an exploded perspective view of a display device, according to one or more exemplary embodiments. FIG. 6 is a cross-sectional view of the display device of FIG. 5 taken along sectional line B-B', according to one or more exemplary embodiments.

Referring to FIGS. 5 and 6, a display device 50a according to another embodiment exemplary embodiment is different from display device 50 of FIG. 1 primarily on the point that reflective layer 230a of light guide member 200a is included in illumination device 20a. Accordingly, the subsequent explanation will focus on reflective layer 230a of light guide member 200a provided in display device 50a.

Light guide member 200a includes light guide panel 210, circuit pattern 220, reflective layer 230a, and plurality of projections 240.

Reflective layer 230a performs a similar function as the function of reflective layer 230 of FIG. 1. However, reflective layer 230a has a multilayer configuration. That is, reflective layer 230a may include first reflective layer 250a, second reflective layer 260a, and third reflective layer 270a stacked on lower surface 213 of light guide panel 210.

First reflective layer 250a and second reflective layer 260a may be formed of materials having different refractive indexes. For example, first reflective layer 250a may be formed of a material having high refractive index, for example, titanium oxide ($TiO_2$). Second reflective layer 260a may be formed of a material having a refractive index that is lower than the refractive index of first reflective layer 250a, for example, silicon oxide ($SiO_2$). Third reflective layer 270a may be formed of a metal material having high reflectivity, for example, silver (Ag).

First reflective layer 250a and second reflective layer 260b may generate constructive interference of the light to increase the reflection efficiency of the light that travels in the lower direction from light guide panel 210. Accordingly, first reflective layer 250a and second reflective layer 260a can increase the reflection efficiency of the light which travels in the lower direction from light guide panel 210 and is reflected toward display panel 10 together with third reflective layer 270a to increase the luminance of the light that is provided to display panel 10.

As described above, display device 50a can be slimmed down through the configuration of plurality of light source packages 100 in a module with light guide member 200a, and with optically-clear adhesive film 300 and fixing tape 30.

Further, since display device 50a is provided with light guide member 200a including reflective layer 230a having a multilayer configuration, the luminance of the light that is provided to display panel 10 can be increased. Accordingly, display device 50a can be slimmer and provide improvement to the display quality.

FIGS. 7, 8, 9, 10, 11, and 12 are respective cross-sectional views of a display device at various stages of manufacture, according to one or more exemplary embodiments.

Figure 7:
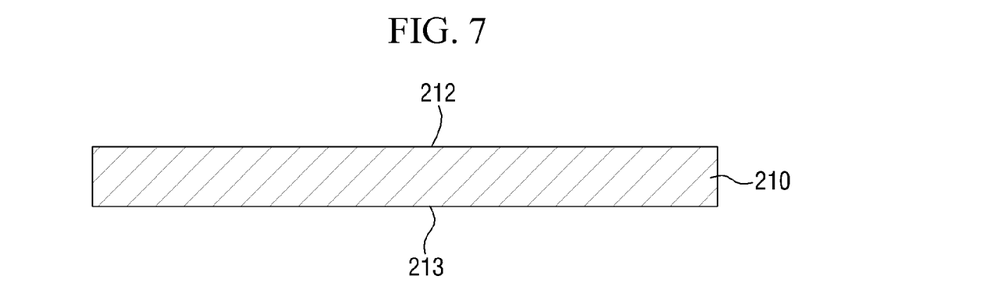
FIGS. 7, 8, 9, 10, 11, and 12 are respective cross-sectional views of a display device at various stages of manufacture, according to one or more exemplary embodiments.

Referring to FIG. 7, light guide panel 210 is prepared. Light guide panel 210 may be in a rectangular plate shape that includes an upper surface 212 and a lower surface 213, and may be composed of a glass substrate.

Figure 8:
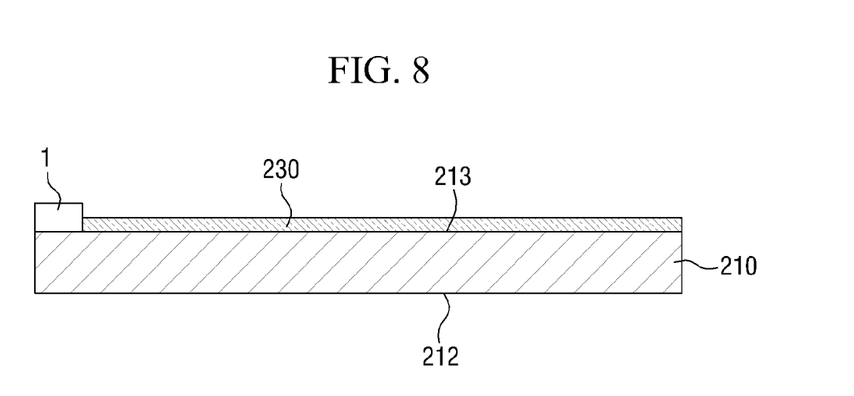

Referring to FIG. 8, reflective layer 230 is formed on a part of lower surface 213 of light guide panel 210. Reflective layer 230 may be formed of a metal material that can reflect light, for example, silver (Ag). Reflective layer 230 may be formed through a photolithography process using photoresist pattern 1, but is not limited thereto. Reflective layer 230 may also be formed through a coating process, a deposition process, or a printing process.

Figure 9:
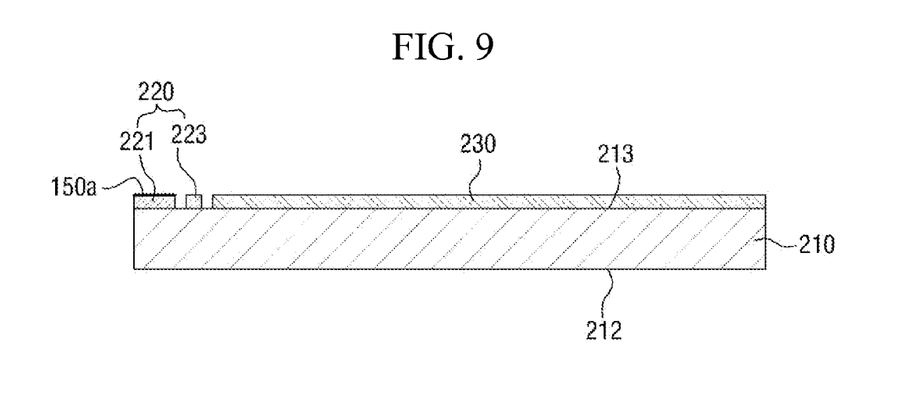

Referring to FIG. 9, circuit pattern 220 is formed in a region of lower surface 213 of light guide panel 210, in which reflective layer 230 is not formed, and solder cream 150a is spread on a first electrode pad 221 and a second electrode pad 222 (in FIG. 4) of circuit pattern 220.

Circuit pattern 220 may be formed of a metal material having high electrical conductivity, for example, copper (Cu). Circuit pattern 220 may be formed through a printing process in a state where reflective layer 230 is temporarily covered by a blocking layer such as a photoresist layer. The printing process may be an inkjet printing process, a squeeze printing process, or an imprint process. The spreading of solder cream 150a may be performed using a metal mask.

On the other hand, in FIGS. 8 and 9, reflective layer 230 and circuit pattern 220 are formed in different processes with different metal materials. If reflective layer 230 and circuit pattern 220 are formed of the same metal material, they can be formed through one process.

Figure 10:
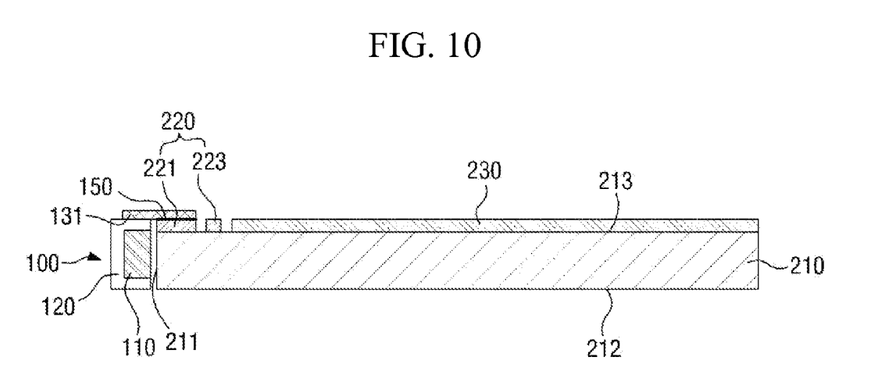

Referring to FIG. 10, first electrode lead 131 and second electrode lead 132 (see FIG. 4) of light source packages 100 are respectively connected to first electrode pad 221 and second electrode pad 222 (see FIG. 4) of circuit pattern 220. In this case, light sources 110 of light source packages 100 face a side surface 211 of light guide panel 210.

Specifically, referring to FIG. 9, in a state where first electrode lead 131 and second electrode lead 132 (see FIG. 4) of light source package 100 are respectively arranged on first electrode pad 221 and second electrode pad 222 (see FIG. 4) of circuit pattern 220, on which solder cream 150a is spread, solder cream 150a is cured through a reflow process, and as illustrated in FIG. 10, conductive layer 150 is formed.

Figure 11:
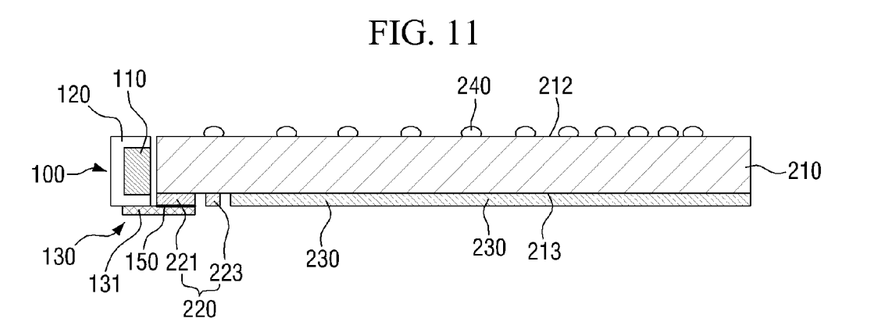

Referring to FIG. 11, a plurality of projections 240 are formed on upper surface 212 of light guide panel 210. The plurality of projections 240 may be formed in a dot pattern. In this case, the plurality of projections 240 may be arranged so that gaps between adjacent projections 240 become smaller the farther the plurality of projections 240 are away from light source packages 100.

The plurality of projections 240 may be formed of a material that can refract light or a material that can refract and diffuse light. For example, plurality of projections 240 may be formed of a material including acryl resin, UV photo-initiators, and additives thereto. The plurality of projections 240 may be formed through a printing process, such as an inkjet process, a squeeze printing process, or an imprint process.

Figure 12:
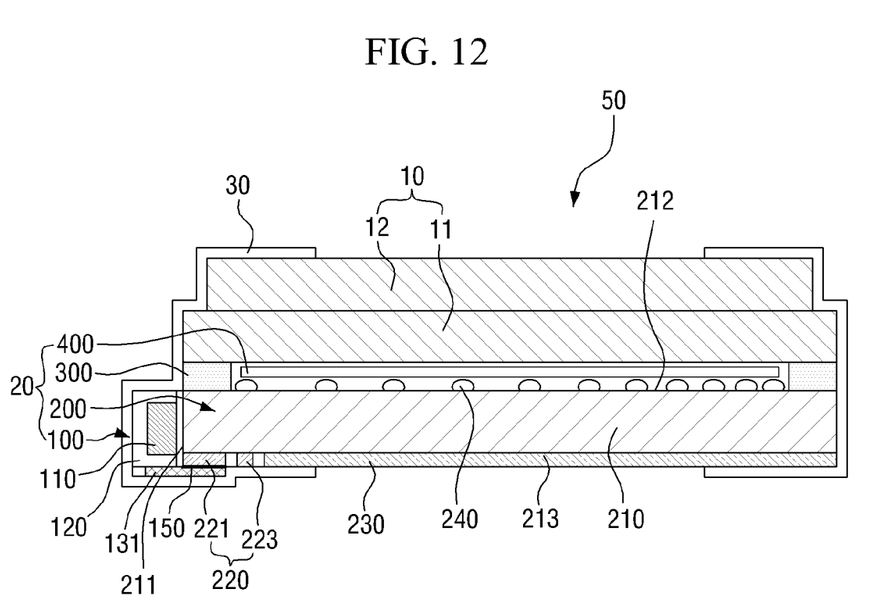

Referring to FIG. 12, an optically-clear adhesive film 300 is attached along the edges of upper surface 212 of light guide panel 210, and an optical sheet 400 is arranged in a space that is defined by upper surface 212 of light guide panel 210 and optically-clear adhesive film 300. Thereafter, display panel 10 is attached to light guide panel 210 using optically-clear adhesive film 300, and fixing tape 30 is attached to cover from edge regions of the upper surface of display panel 10 to edge regions of lower surface 213 of light guide panel 210. Accordingly, display device 50 can be manufactured. Display device 50a can be manufactured with a similar process, with additional processing steps relating to the construction of light guide member 200a.

It should be understood that the exemplary embodiments described therein should be considered in a descriptive sense only and not for purposes of limitation. Descriptions of features or aspects within each embodiment should typically be considered as available for other similar features or aspects in other embodiments.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. An illumination device, comprising:
   a first light source package comprising a first electrode lead and a second electrode lead, the first and second electrode leads projecting from a side of the first light source package;
   a second light source package comprising a first electrode lead and a second electrode lead, the first and second electrode leads projecting from a side of the second light source package;
   a light guide member adjacent to the first and second light source packages,
   wherein the light guide member comprises:
      a light guide panel; and
      a circuit pattern disposed on a surface of the light guide panel, the circuit pattern comprising first electrode pads connected to the first electrode leads and second electrode pads connected to the second electrode leads; and
   first conductive layers respectively disposed between the first electrode leads and the first electrode pads; and
   second conductive layers respectively disposed between the second electrode leads and the second electrode pads.

2. The illumination device of claim 1, wherein the first and second conductive layers comprise at least one of solder layers and anisotropic conductive film layers.

3. The illumination device of claim 1, wherein:
   the first electrode pads are anode power supply pads; and
   the second electrode pads are cathode power supply pads.

4. The illumination device of claim 1, wherein:
   the first and second light source packages respectively comprises a light source electrically connected to the first electrode lead and the second electrode lead, the light source being configured to radiate light towards the light guide panel; and
   the circuit pattern comprises driving wiring portions selectively connected to at least one of a first electrode pad of the first electrode pads, a second electrode pad of the second electrode pads, and both first and second electrode pads of the first and second electrode pads, the circuit pattern being configured to supply, via the driving wiring, driving power to the light sources of the first and second light source packages.

5. The illumination device of claim 1, wherein the light guide panel comprises a glass substrate.

6. The illumination device of claim 1, wherein:
the light guide member further comprises a pattern of projections disposed on a second surface of the light guide panel, the second surface opposing the first surface.

7. The illumination device of claim 6, wherein gaps between adjacent projections decrease with increasing distance from the first and second light source packages.

8. An illumination device, comprising:
a first light source package comprising a first electrode lead and a second electrode lead, the first and second electrode leads projecting from a side of the first light source package;
a second light source package comprising a first electrode lead and a second electrode lead, the first and second electrode leads projecting from a side of the second light source package; and
a light guide member adjacent to the first and second light source packages,
wherein the light guide member comprises:
a light guide panel;
a circuit pattern disposed on a surface of the light guide panel, the circuit pattern comprising first electrode pads connected to the first electrode leads and second electrode pads connected to the second electrode leads; and
a reflective layer disposed on the surface of the light guide panel, the reflective layer being adjacent to the circuit pattern.

9. The illumination device of claim 8, wherein the circuit pattern and the reflective layer comprise a same metal material or different metallic materials.

10. The illumination device of claim 8, wherein the reflective layer comprises stack of reflective layers disposed on the surface of the light guide panel.

11. A display device, comprising:
a display panel;
a first light source package comprising a first electrode lead and a second electrode lead, the first and second electrode leads projecting from a side of the first light source package;
a second light source package comprising a first electrode lead and a second electrode lead, the first and second electrode leads projecting from a side of the second light source package; and
a light guide member adjacent to the first and second light source packages,
wherein the light guide member comprises:
a light guide panel comprising a first surface opposing a second surface, and
a circuit pattern disposed on the first surface of the light guide panel, the circuit pattern comprising first electrode pads connected to the first electrode leads and second electrode pads connected to the second electrode leads, and
wherein the display device further comprises:
an optically-clear, adhesive film disposed between a first surface of the display panel and the second surface of the light guide panel, the optically-clear, adhesive film being arranged along an edge region of the first surface of the display panel; and
fixing tape covering an edge region of a second surface of the display panel to an edge region of the first surface of the light guide panel, the second surface of the display panel opposing the first surface of the display panel.

12. The display device of claim 11, further comprising:
first conductive layers respectively disposed between the first electrode leads and the first electrode pads; and
second conductive layers respectively disposed between the second electrode leads and the second electrode pads.

13. The display device of claim 12, wherein the first and second conductive layers comprise at least one of solder layers and anisotropic conductive film layers.

14. The display device of claim 11, wherein:
the first electrode pads are anode power supply pads; and
the second electrode pads are cathode power supply pads.

15. The display device of claim 11, wherein:
the first and second light source packages comprise a light source electrically connected to the first electrode lead and the second electrode lead, the light source being configured to radiate light towards the light guide panel; and
the circuit pattern comprises driving wiring portions selectively connected to at least one of a first electrode pad of the first electrode pads, a second electrode pad of the second electrode pads, and both first and second electrode pads of the first and second electrode pads, the circuit pattern being configured to supply, via the driving wiring, driving power to the light sources of the first and second light source packages.

16. The display device of claim 11, wherein the light guide panel comprises a glass substrate.

17. The display device of claim 11, wherein the light guide member further comprises a reflective layer disposed on the first surface of the light guide panel, the reflective layer being adjacent to the circuit pattern.

18. The display device of claim 11, wherein the light guide member further comprises a pattern of projections disposed on the second surface of the light guide panel.

19. The display device of claim 11, further comprising:
an optical sheet disposed in a space defined by the optically-clear, adhesive film and the second surface of the light guide panel.

* * * * *